Figure 1:
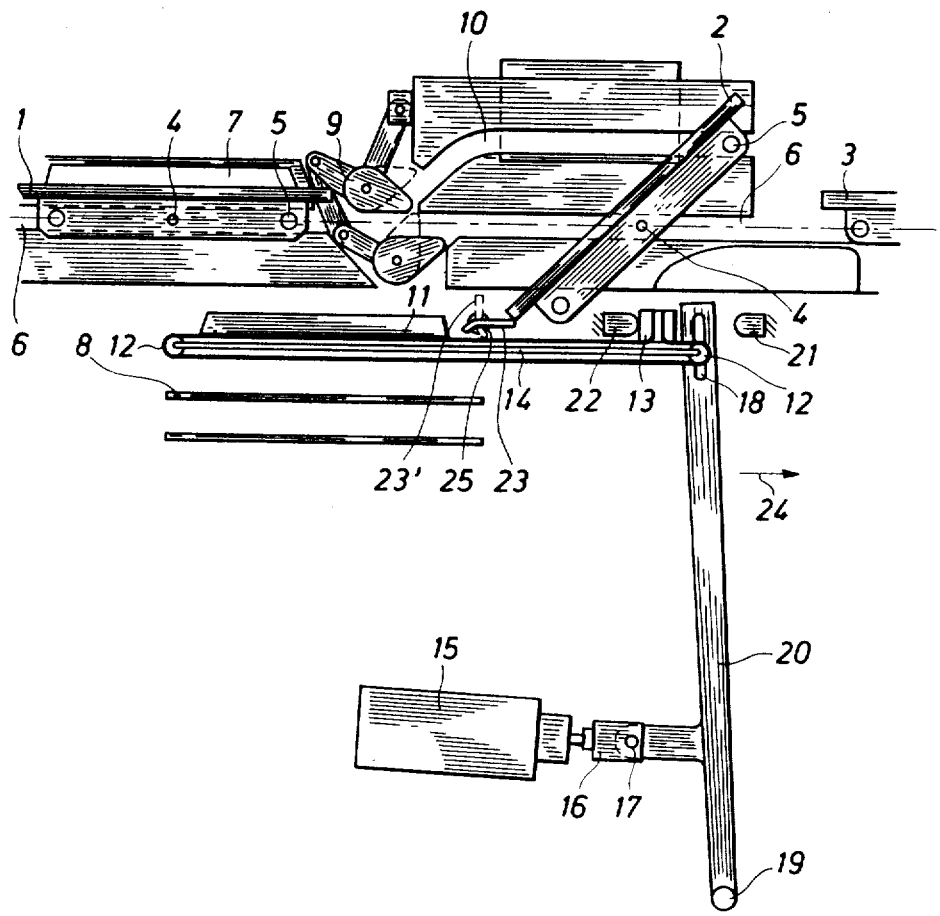

United States Patent
Aasted

[15] 3,701,406
[45] Oct. 31, 1972

[54] STORING MECHANISM FOR USE IN TRANSFERRING OBJECTS FROM ONE CONVEYOR TO ANOTHER

[72] Inventor: Kai Christian Sophus Aasted, Skovgardsvej 41, 2920 Charlottenlund, Denmark

[22] Filed: Jan. 26, 1971

[21] Appl. No.: 109,914

[30] Foreign Application Priority Data

Jan. 30, 1970  Denmark ..................... 454/70

[52] U.S. Cl. ...................................... 198/20, 198/81
[51] Int. Cl. ........................ B65g 47/00, B65g 37/00
[58] Field of Search .......... 198/20, 26, 27, 28, 78, 81, 198/146, 147, 185, 188; 271/69, 77, 78

[56] References Cited

UNITED STATES PATENTS 2,888,126   5/1959   Leaman et al. ............... 198/27

Primary Examiner—Richard E. Aegerter
Assistant Examiner—H. S. Lane
Attorney—Waters, Roditi, Schwartz & Nissen

[57] ABSTRACT

When chocolate slabs are transferred from a conveyor plate to an inferior transverse conveyor band by tilting the plate the slabs will be unevenly deposited on the band. A storing mechanism consisting of a slab receiving intermediate plate has been introduced between the two conveyors and then suddenly pushed away, whereby the slabs fall simultaneously down on the band. To avoid scraping of the underside of the slabs it is now suggested to substitute the intermediate plate by a conveyor band having its ends attached to a fixed bar and said band being laid over two cross bars or rollers which are simultaneously displaceable mainly in the plane of the band.

5 Claims, 2 Drawing Figures

STORING MECHANISM FOR USE IN TRANSFERRING OBJECTS FROM ONE CONVEYOR TO ANOTHER

The invention relates to a storing mechanism for a brief stay of objects that are to be transferred from a conveyor having tiltable conveyor plates to an underlying transversely running band conveyor.

To avoid uneven deposit of the objects on the transversely running band conveyor it had been proposed to use a storage mechanism which, after having received one or more objects, discharge these almost momentarily onto the transversely running band conveyor. The said mechanism consists of a horizontal plate which in its receiving position is located in the area between the two conveyors and which, when discharging objects, is so rapidly withdrawn from the said area that the objects drop directly onto the transversely running band conveyor. However, at the rapid movement of the plate a heavy friction with the objects cannot be avoided, and if these consist of a soft material such as chocolate, unattractive traces of scraping on the underside of the objects cannot be avoided. Nor can it be avoided that chocolate particles scraped off stick to the surface of the plate, which will involve that it will scrape the underside of following objects still more and the friction with these will ultimately be so heavy that the objects will not fall properly upon the transversely running conveyor.

The object of the invention is to remedy these drawbacks by avoiding any friction between the storage mechanism and the objects while these are being deposited on the transversely running band conveyor.

According to the invention an endless conveyor band running over two parallel cross bars is provided between the two conveyors, the said conveyor band being by means of stop members connected at such part of the upper band section as is lying outside the area between the two conveyors, the said cross bars being rotatably supported substantially in the plane of the band and being maintained at constant distance apart. When the storing mechanism is moved, such of its parts as are directly supporting the objects will move downwards and away beneath these. As a result, the underside of the objects is not liable to be scratched or abraded, nor will any component of horizontal movement be imparted to the objects owing to friction or the like while the storing mechanism is being removed beneath them.

According to the invention each cross bar may consist of a rotatable band roller supported in bearings in a frame that is movable substantially in the plane of the band. With the use of such rollers the friction between the underside of the band and the parts around which the band is laid will be reduced, and it is possible to use a heavy, less flexible band having a longer life, partly because it is heavier, partly because it is subjected to less wear.

According to the invention the stop members may be constituted by a clamp holder which is movable with the band along a short length of the distance between the two end positions, for example marked by a stop, the said length being adapted in such manner that it may actually ensure an alignment of the chocolate objects when these are striking against a vertical rail provided above the band. This will ensure an accurate position and arrangement of the objects directly before they are discharged onto the transversely moving band conveyor.

Furthermore, the bars or band rollers may according to the invention be displaceable in horizontal tracks and the cross bar or roller lying outside the area between the conveyors may be connected with a long pivotable bar for moving the mechanism. With the band rollers supported in this manner the frame and the other movable parts may be of very light design and of a negligible amount of material so that the movement may be quick and require very little force, use being made, for example, of a hydraulic cylinder the piston of which is pivotally connected with the said long bar.

Further, according to the invention the track of the cross bars or band rollers may form an acute angle with the direction of movement of the longitudinal conveyor. The said angle compensates for the error that may arise if the transverse conveyor moves over a substantial length from the moment an object at first contacts the conveyor to the moment when the object is resting fully on same. The storing mechanism should be so arranged that the said angle can be regulated so that the compensation for the said error, which would otherwise involve that the objects would be turned somewhat on the conveyor, may be corrected when the plant has been put into operation and the speeds of the conveyors have been ultimately decided upon. The greater the supporting surface of the objects and the greater the speed of the transversely running band conveyor, the greater is the requirement for the said angular correction.

The drawing shows schematically an embodiment of the storing mechanism according to the invention by way of example.

Figure 2:
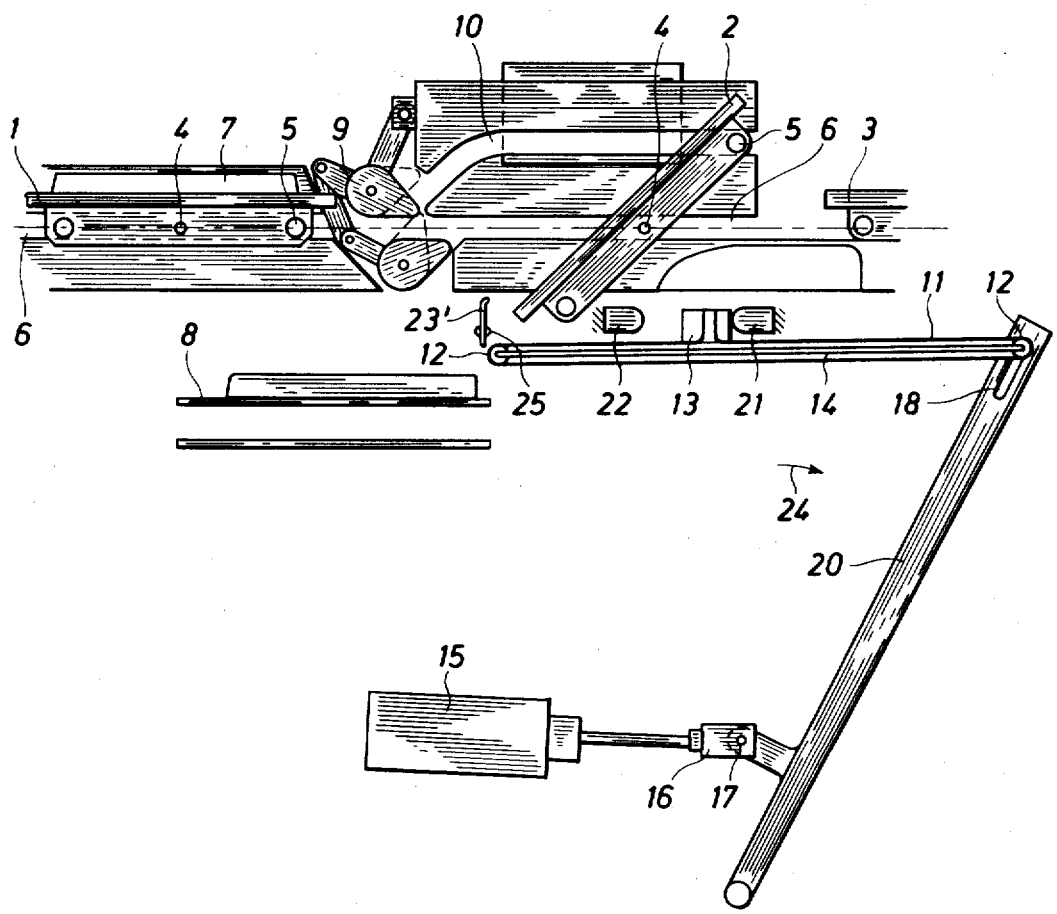

FIG. 1 shows the mechanism in its receiving position, viewed in the transverse direction, and FIG. 2 the same while the objects are being discharged to the transversely running band conveyor.

In the drawing, 1, 2, and 3 are conveyor plates of a longitudinal conveyor. The plates are suspended by means of pivots 4 in a pair of conveyor chains (not shown) extending parallel to each other and moved at identical speeds. The plates are kept in horizontal position by guide pins 5 engaging a horizontal guiding track 6. When an object 7 is to be discharged onto an underlying transversely running band conveyor 8, the conveyor plate 2 which is located opposite the conveyor 8 is tilted to an inclining position, the guide pin 5 being passed up into a side track 1o by a switching mechanism 9.

The object, for example a slab of chocolate, will then slide down upon a storing mechanism mounted in the area between the two conveyors.

The string mechanism consists of a conveyor band 11 passing tautly around a pair of rollers 12 and having its ends attached to a clamp holder 13. The rollers 12 are supported in a frame 14 which may have parts located between the parts of the band 11.

For quick movement of the band 11 between the two positions indicated in FIGS. 1 and 2 use may be made of a hydraulic cylinder 15 the piston rod 16 of which is connected by means of a pin 17 to a long bar 20 pivotally attached to a lower pin 19 and having at its upper end a bearing for the roller 12 which is continually outside the area between the conveyors, the said bearing being displaceable in a slit 18 provided in the bar 2o.

On activation of the hydraulic cylinder 15 the frame 14 is moved into and out of the area between the conveyors. When the bar 20 is moved by the cylinder 15 in the direction of an arrow 24 (FIG. 1), the clamp holder 13 will be passed from a stop 22, but shortly after be stopped by another stop 21. As a result, the chocolate objects on the conveyor 11 will be caused to rest against a vertical spring-loaded plate 23 and be brought into line. The plate 23 is moved down into the position indicated in FIG. 1 whenever a conveyor plate 2 is passing and will again be returned by a spring 25 into the position 23' after the conveyor plate 2 having passed. By the said tilting a chocolate object lying with one end on the plate will be tilted down upon the band 11 directly before the cylinder 15 is activated.

On the continued movement of the conveyor 11 the chocolate objects will be released from their support and fall down upon the conveyor 8.

The hydraulic cylinder may be electronically controlled so as only to be activated when light-sensitive cells provided along the area above the band 11 and activated by beams from lamps at the opposite side of the band 11 register that the storing mechanism is about being full, simultaneously with other light-sensitive cells capable of receiving beams of light across the space above those parts of the conveyor 8 which are about being passed beneath the storing mechanism registering that the band is free. As soon as the storing mechanism has reached the position indicated in FIG. 2, it is directly returned to the position indicted in FIG. 1 so that it is promptly ready again to receive objects from the conveyor plates of the longitudinal conveyor when these are passing the inclined position 2. If the band 11 carries a supply of objects and therefore is not ready to receive a further load, the mechanism 9 will not switch to the upper track 1o, by which the conveyor plate involved will pass the point of discharge without leaving its horizontal position. The object or objects lying on the said plate will therefore not be discharged to the band 11, but be passed on to another band 11 at a following station.

For the sake of clarity the storing mechanism is illustrated in the drawing as being parallel with the longitudinal conveyor, but in practice it ought to be adjustable to form an angle in relation to same so as to compensate for the error referred to in the foregoing, which error might otherwise arise owing to the band moving a substantial distance from the moment at which an object contacts the conveyor with its front end to the moment at which it is resting fully on the said conveyor.

If desired, the tracks (not shown) of the cross bars or the band rollers 12 may be adjusted so that they form an acute angle with the longitudinal conveyor.

I claim:

1. A storing mechanism for a brief stay of objects being transfered from a first conveyor having tiltable conveyor plates to a second underlying transversely moving band conveyor, said mechanism comprising an endless conveyor band positioned intermediate said first and second conveyors, two parallel spaced rotatable rollers, said conveyor band extending between and being entrained about said rollers, abutment means formed on the upper run of said conveyor band exteriorly of the region defined by the overlap between said first and second conveyors, stationary stop members adapted to be contacted by said abutment means for limiting longitudinal movement thereof, and means for reciprocating said rollers in the plane of the conveyor band at a constant spaced distance.

2. A storing mechanism as claimed in claim 1, said means for reciprocating said rollers including a frame movable substantially in the plane of the band, said rollers being each rotatably journalled in said frame.

3. A storing mechanism as claimed in claim 1, said abutment means comprising a clamp holder movable with said conveyor band along a predetermined short portion of the distance of movement by said conveyor band between two end positions, said stop members limiting said movement of the clamp holder, a vertical rail adapted to be struck by said objects positioned above said conveyor band, the distance of movement of said clamp holder ensuring the objects being arranged in line upon striking against said vertical rail.

4. A storing mechanism as claimed in claim 1, comprising horizontal tracks in which the rollers are displaceably positioned, each said roller being located exteriorly of the overlapping region between said first and second conveyors, and said reciprocating means including an elongate pivotable bar being connected to at least one of said rollers for imparting reciprocating movement to the mechanism.

5. A storing mechanism as claimed in claim 4, the horizontal tracks of said rollers forming an adjustable acute angle with the direction of movement of said first conveyor.

* * * * *